United States Patent
Joung

(10) Patent No.: US 7,465,930 B2
(45) Date of Patent: Dec. 16, 2008

(54) WOBBLING MECHANISM TO COMPENSATE FOV TRUNCATION IN SPECT SYSTEMS

(75) Inventor: Jinhun Joung, Algunquin, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 235 days.

(21) Appl. No.: 11/414,462

(22) Filed: Apr. 28, 2006

(65) Prior Publication Data

US 2007/0252087 A1    Nov. 1, 2007

(51) Int. Cl.
*G01T 1/166* (2006.01)
(52) U.S. Cl. ............................ 250/363.05; 250/363.03; 250/361 R; 378/197; 378/198
(58) Field of Classification Search ............ 250/363.03, 250/363.05, 361 R; 378/197, 198
See application file for complete search history.

(56) References Cited

U.S. PATENT DOCUMENTS

| | | | | |
|---|---|---|---|---|
| 3,790,782 A * | 2/1974 | Inoue et al. ............. | 250/361 R |
| 5,591,977 A * | 1/1997 | Green et al. ........... | 250/363.03 |
| 5,691,538 A * | 11/1997 | Ohike et al. ........... | 250/363.05 |
| 5,717,212 A * | 2/1998 | Fulton et al. ........... | 250/363.05 |
| 5,760,402 A * | 6/1998 | Hug et al. .............. | 250/363.05 |
| 6,204,503 B1 * | 3/2001 | Pierfitte et al. ......... | 250/363.05 |
| 6,242,743 B1 * | 6/2001 | DeVito et al. .......... | 250/363.05 |
| 2004/0170254 A1 * | 9/2004 | Gregerson et al. .......... | 378/197 |
| 2006/0065840 A1 * | 3/2006 | Joung et al. ............ | 250/363.05 |
| 2006/0120511 A1 * | 6/2006 | Gregerson et al. .......... | 378/198 |

* cited by examiner

*Primary Examiner*—David P Porta
*Assistant Examiner*—Djura Malevic
(74) *Attorney, Agent, or Firm*—Peter L. Kendall

(57) ABSTRACT

A nuclear imaging system and method are provided for synchronously recovering the field of view of a target to be imaged includes multiple detectors attached to a gantry, a support member or wobbling ring and a driver. The driver engages the wobbling ring whereby the wobbling ring rotates with respect to the gantry. The wobbling ring cooperates with the detectors causing the detectors to synchronously adjust to multiple viewing positions of a detection target, enabling recovery of the full field of view from an otherwise truncated field of view if the detectors were stationary with respect to the gantry.

21 Claims, 2 Drawing Sheets

WOBBLING MECHANISM TO COMPENSATE FOV TRUNCATION IN SPECT SYSTEMS

BACKGROUND OF THE INVENTION

1. Field of the Invention

The present invention generally relates to nuclear medicine, and systems for obtaining images of a patient's body organs of interest. In particular, the present invention relates to a mechanism for reducing Field of View truncation in SPECT systems.

2. Description of the Background Art

Nuclear medicine is a unique medical specialty wherein radiation is used to acquire images that show the function and anatomy of organs, bones or tissues of the body. Radiopharmaceuticals are introduced into the body, either by injection or ingestion, and are attracted to specific organs, bones or tissues of interest. Such radiopharmaceuticals produce gamma photon emissions that emanate from the body. One or more detectors are used to detect the emitted gamma photons, and the information collected from the detector(s) is processed to calculate the position of origin of the emitted photon from the source (i.e., the body organ or tissue under study). The accumulation of a large number of emitted gamma positions allows an image of the organ or tissue under study to be displayed.

One type of nuclear imaging system is single photon imaging, or SPECT, relies on the use of a collimator placed in front of a solid state detector, to allow only gamma rays aligned with the holes of the collimator to pass through to the detector. With use of a parallel hole collimator, only rays normal to the face of the detector will pass through to be detected, and therefore smaller detectors will have a more narrowed perimeter of sight.

Solid state detectors offer significant advantage because of their small size, light weight, excellent spatial resolution and compatibility. These advantages enable design freedom for creating more sophisticated geometries to improve imaging resolution for SPECT systems.

Such improved geometries include full or partial ring geometries which have advantages over previous conventional single or dual head systems. However, with such new geometries, collimation becomes more difficult resulting in Field of View (FOV) truncation problems. Truncation occurs when a small modular detector images a relatively large FOV. Due to the parallel hole collimator, when many small solid state detectors form a ring around the FOV, or if one or more detectors orbit the intended FOV, some portions of the FOVE will lie outside the perimeter edge of the detector's line of sight, causing truncation of the image.

One resolution to avoid truncation has been to provide the detector with motion so that the entire FOV can be sampled and the image can then be reconstructed. Drawbacks to this however are that the motion requirement increases system cost as well as potential system error due to positioning inaccuracies and asynchronous motion among the detectors.

Therefore what is needed is a mechanism by which detectors can recover the full FOV efficiently and with high resolution.

SUMMARY OF THE INVENTION

A system and method for nuclear imaging with use of small modular solid state detectors for recovering a full field of view is described in the embodiments herein. One embodiment includes multiple detectors each with a gantry attachment site and a gantry. The multiple detectors are each attached to the gantry at the gantry attachment site, and a support member. The support member cooperates with the detectors such that the support member synchronously positions the detectors to multiple viewing positions whereby the full field of view can be recovered.

Additionally, in other embodiments a wobbling ring can be used to affect the detectors' viewing position. The detectors would be attached to the wobbling ring at a wobbling ring pivot site. The detectors would be attached to the gantry at a gantry pivot site. A driver would act on the wobbling ring causing its rotation. The wobbling ring, as it rotates, would cooperate with the detectors, synchronously positioning them in multiple viewing positions so they could recover the full field of view.

In another embodiment there is a method involving locating a gantry, attaching multiple detectors to the gantry such that the detectors will be a predetermined distance from the field of view, where the detectors can be positioned in multiple viewing positions. The next step involves synchronously positioning the detectors to multiple viewing positions to view and recover the full field of view.

The above and other features and advantages of the present invention, as well as the structure and operation of preferred embodiments of the present invention, are described in detail below with reference to the accompanying drawings.

DETAILED DESCRIPTION OF THE PREFERRED EMBODIMENTS

While the present invention may be embodied in many different forms, there is described herein in detail an illustrative embodiment(s) with the understanding that the present disclosure is to be considered as an example of the principles of the invention and is not intended to limit the invention to the illustrated embodiment(s).

Figure 1A:
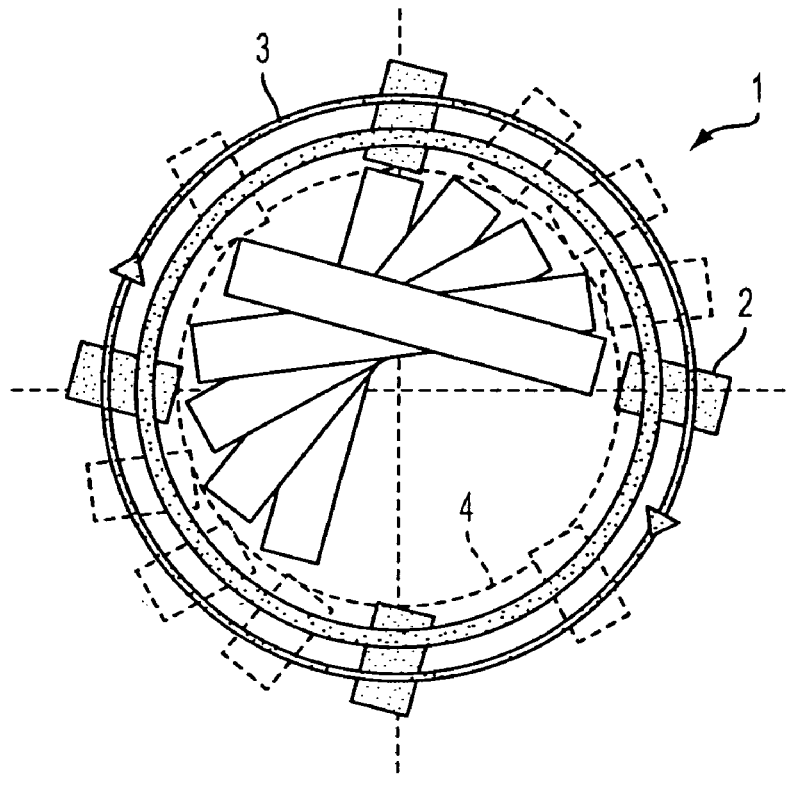
FIG. 1*a* is a plan view of one embodiment of a wobbling system with detectors in a first viewing position.
Figure 2A:
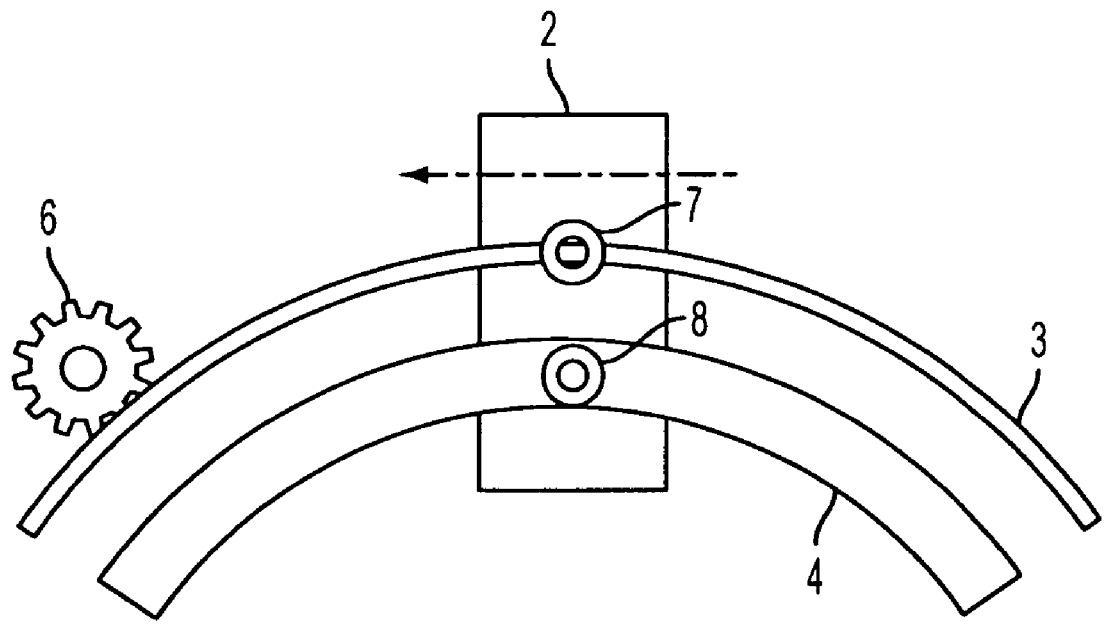
FIG. 2*a* is a plan view of one embodiment of a detector in the wobbling system.

FIG. 1*a* displays one embodiment of a synchronized wobbling system 1. Also shown in FIG. 1*a* as part of the wobbling system are detectors 2. There must be more than one, or multiple, detectors in order for synchronized positioning to be carried out. The detectors 2 are attached to a gantry 4, which acts as a framework for maintaining the detectors. The detectors 2 can also be attached to a wobbling ring 3. The detectors 2 can be attached to the gantry 4 at a gantry attachment site or a gantry pivot site 8 as seen in FIG. 2*a*. The detectors 2 can also be attached to the wobbling ring at a wobbler pivot site 7. Additionally, the gantry pivot site 8 and the wobbler pivot site 7 can utilize bearings to facilitate the detectors' movements. In another embodiment the wobbler ring 3 need not be circular but can take on other shapes, and furthermore, in other embodiments there can instead be a supporting member or similar mechanism which cooperates or communicates with the detectors 2 to synchronously affect their viewing position and recover a full FOV.

Rotating or positioning the wobbler ring 3 causes the detectors 2 to synchronously change their rotational position or viewing position of the intended detection target. By synchronously changing this viewing position, the detectors 2 can view the intended target directly on (i.e., normal to the target), or at non-normal angles in order to avoid truncation and obtain a more complete and accurate image of the FOV.

Figure 1B:
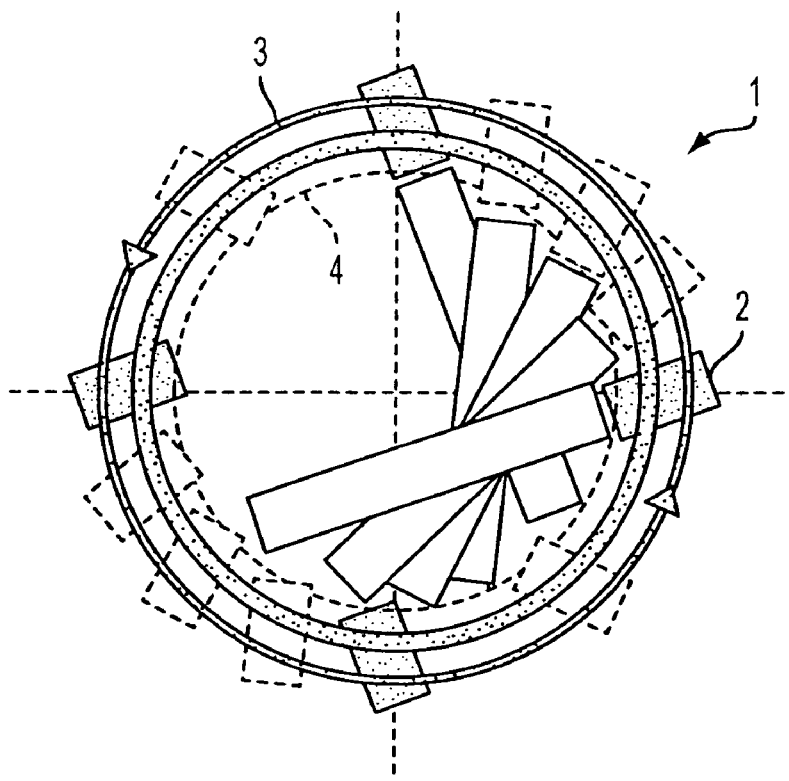
FIG. 1*b* is a plan view of one embodiment of a wobbling system with the detectors in a second viewing position.

This synchronous positioning of the detectors is illustrated in FIGS. 1a and 1b. In FIG. 1a, the wobbling ring 3 is rotated or turned in a clockwise manner. This synchronously drives the detectors 2 to a first viewing position, whereby the detectors 2 each view the FOV from the perspective of their first position. A detection reading can be taken, and thereafter, the wobbling ring 3 can be rotated or adjusted in a counterclockwise manner thereby positioning the detectors 2 in a second viewing position as seen in FIG. 1b. The second viewing position enables the detectors 2 to view a different portion of the FOV or view the FOV from a different angle. By combining the readings taken from different viewing positions in a synchronous manner, a more complete and accurate image can be produced. Furthermore, the detectors 2 can be synchronously positioned to multiple viewing positions, and can obtain detection readings continuously throughout the movement across the field of view.

Figure 2B:
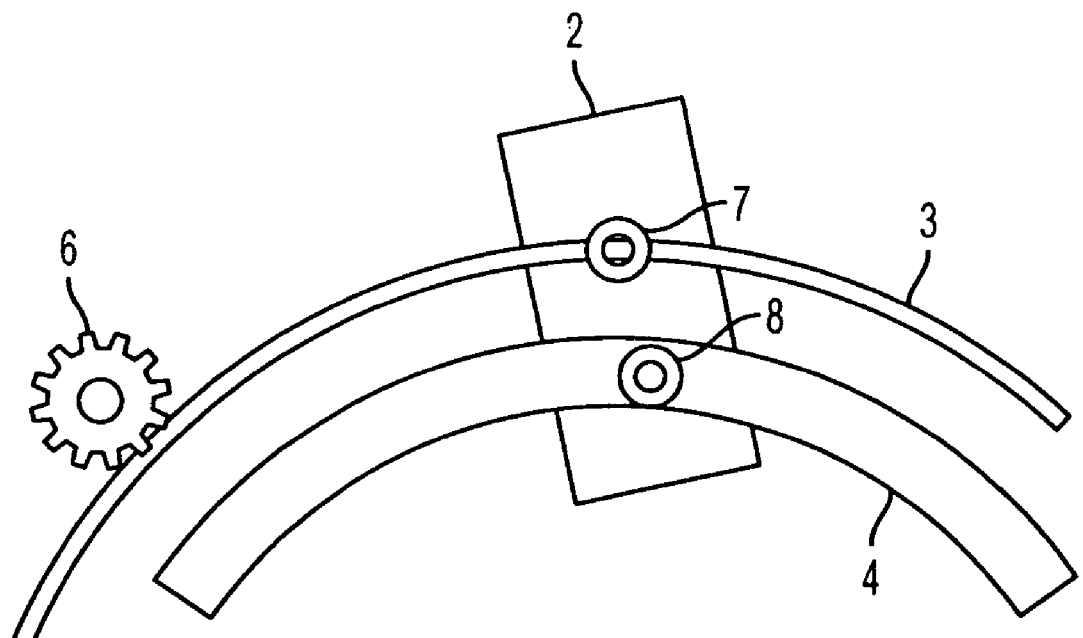
FIG. 2*b* is a plan view of one embodiment of a detector in the wobbling system.

Illustrated in FIGS. 2a and 2b is a detector 2 in the wobbling system 1, which shows the detector 2 in different viewing positions as affected by the rotational movement of the wobbling ring 3.

Additionally, as displayed in FIG. 2a, a driver or motor 6 can be utilized to provide motion to the wobbling ring. Also, in the preferred embodiment, the gantry is fixed, however, in other embodiments, it can be configured to orbit the FOV as the detectors 2 are positioned detection readings taken. Further, while a wobbling ring has been disclosed as a mechanism for providing the synchronous positioning of detectors to recover truncated FOV, it will be apparent that other structures and mechanisms also can be used to accomplish the same purpose. For example, calibrated stepper motors with a common driving signal may be used instead of the wobbling ring.

The invention having been thus described, it will be apparent to those skilled in the art that the same may be varied in many ways without departing from the spirit of the invention. Any and all such modifications as would be obvious to those skilled in the art are intended to be covered within the scope of the following claims.

What is claimed is:

1. A nuclear image detection system for recovering a full field of view of a target to be imaged, comprising:
    a gantry;
    multiple detectors each having a gantry attachment site thereon and being attached to said gantry at said gantry attachment site; and
    an arrangement cooperating with said gantry such that the arrangement synchronously moves said multiple detectors to different viewing angles with respect to said gantry whereby the full field of view of a target to be imaged can be recovered.

2. The system of claim 1, wherein the gantry is fixed.

3. The system of claim 1, wherein said arrangement includes a support member,
    wherein the detectors are moved at said gantry attachment site by movement of the support member from a first viewing angle to a second viewing angle whereby the full field of view can be recovered.

4. The system of claim 1, wherein the detectors obtain detection readings at each of the multiple viewing angles.

5. The system of claim 1, wherein the detectors obtain detection readings continuously throughout said synchronous movement.

6. The system of claim 1, wherein the different multiple viewing angles enable the detectors to view different portions of the field of view.

7. The system of claim 1, wherein said arrangement includes a support member, wherein the gantry and the support member both rotate so that the detectors orbit the desired field of view.

8. The system of claim 7, wherein the support member is a wobbling ring.

9. The system of claim 8, wherein the gantry attachment site is also a gantry pivot site.

10. The system of claim 9, wherein the detectors each have a wobbler pivot site wherein the detectors can attach to the wobbling ring at the wobbler pivot site.

11. The system of claim 10, wherein the gantry pivot site and the wobbling pivot site have a bearing so that the detectors may rotate freely.

12. The system of claim 10, wherein said arrangement further comprises a driver.

13. The system of claim 12, wherein said driver cooperates with the wobbling ring so that the wobbling ring can be rotated by the driver;
    wherein said wobbling ring cooperates with the detectors such that when rotated the detectors will pivot at the gantry pivot site and wobbler pivot site as the wobbling ring rotates, wherein the detectors can be synchronously rotated to multiple viewing angles to recover the full field of view.

14. The system of claim 13, wherein the wobbling ring can be rotated in either a clockwise or counterclockwise direction.

15. A nuclear image detection system for detection of a full field of view of a target to be imaged, comprising:
    a plurality of detectors;
    a gantry;
    wherein the detectors are attached to the gantry in an arrangement such that the detectors can have multiple viewing angles of said target with respect to the gantry; and
    means for synchronously moving the detectors with respect to the gantry such that they can each be simultaneously moved to one of said multiple viewing angles whereby the full field of view can be recovered.

16. The system of claim 15, wherein the detectors have a first viewing angle and a second viewing angle;
    wherein the viewing angle of the detectors can be synchronously adjusted from the first viewing angle to the second viewing angle whereby the full field of view can be recovered.

17. The system of claim 15, wherein the detectors obtain detection readings continuously throughout said synchronous movement.

18. A method for recovery of a full field of view of a target to be imaged by a nuclear medicine imaging system, comprising the steps of:
    providing multiple detectors on a gantry such that said detectors will be positioned at a predetermined distance from said field of view, wherein the detectors are attached to the gantry in a manner that allows said detectors to be moved to multiple viewing angles; and
    synchronously moving said detectors to different viewing angles with respect to said gantry such that said detectors simultaneously view said target from corresponding predefined viewing angles with respect to said gantry to recover a full field of view of said target from an otherwise truncated field of view if said detectors were not positionable to multiple viewing angles with respect to said gantry.

19. The method of claim 18, further comprising the step of continuously obtaining detection readings throughout detector movement across the field of view.

20. The method of claim 18, wherein the synchronous positioning utilizes a wobbling ring which cooperates with the detectors to affect their viewing positions.

21. A nuclear imaging system for recovering a full field of view of a target to be imaged, comprising:

a gantry;

a wobbling ring;

a plurality of detectors each having a gantry pivot site at which a detector is attached to said gantry and a wobbling pivot site at which a detector is attached to said wobbling ring; and a driver that rotates said wobbling ring with respect to said gantry such that as said wobbling ring rotates said plurality of detectors are synchronously pivoted about their respective gantry pivot sites to a plurality of imaging viewing angles so as to recover the full field of view of said target.

\* \* \* \* \*